United States Patent
Yuan (10) Patent No.: US 11,775,029 B2
(45) Date of Patent: Oct. 3, 2023

(54) CONNECTION DEVICE AND ELECTRONIC DEVICE

(71) Applicant: Lenovo (Beijing) Limited, Beijing (CN)

(72) Inventor: Chunfeng Yuan, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 0 days.

(21) Appl. No.: 17/691,097

(22) Filed: Mar. 9, 2022

(65) Prior Publication Data
US 2023/0094783 A1 Mar. 30, 2023

(30) Foreign Application Priority Data

Sep. 30, 2021 (CN) .......................... 202111161436.5

(51) Int. Cl.
*G06F 1/16* (2006.01)
*F16C 11/12* (2006.01)
(52) U.S. Cl.
CPC .......... *G06F 1/1681* (2013.01); *F16C 11/12* (2013.01); *G06F 1/1616* (2013.01)
(58) Field of Classification Search
None
See application file for complete search history.

(56) References Cited

U.S. PATENT DOCUMENTS 9,624,703 B1 * 4/2017 Lin .......................... E05D 3/12
10,474,203 B2 * 11/2019 Tazbaz ................. G06F 1/1681

FOREIGN PATENT DOCUMENTS

CN 103148087 A 6/2013

* cited by examiner

*Primary Examiner* — Anthony Q Edwards
*Assistant Examiner* — Rashen E Morrison
(74) *Attorney, Agent, or Firm* — ANOVA LAW GROUP, PLLC (57) ABSTRACT

A connection device includes a first rotation shaft, a second rotation shaft, a fixed member, a movable member, an elastic part, and a movable member. The first rotation shaft has a first operation part, and the first operation part includes a first protrusion part and a first snap-fit slot adjacently arranged along a circumferential direction of the first rotation shaft. The second rotation shaft has a second operation part, and the second operation part includes a second protrusion part and a second snap-fit slot adjacently arranged along a circumferential direction of the second rotation shaft. The fixed member is configured to keep a distance between the first rotation shaft and the second rotation shaft. The movable member is arranged between the first operation part and the second operation part. The elastic part configured to provide the movable member with a deformation force for moving toward the second operation part.

18 Claims, 8 Drawing Sheets

CONNECTION DEVICE AND ELECTRONIC DEVICE

CROSS-REFERENCE TO RELATED DISCLOSURE

This application claims priority to Chinese Patent Application No. 202111161436.5, entitled "Connection device and Electronic Device" and filed on Sep. 30, 2021, the entire content of which is incorporated herein by reference.

TECHNICAL FIELD

The present disclosure relates to a connection device and an electronic device.

BACKGROUND

A connection device is a device that people often use, and a connection device may be configured to connect structural parts. It has become a problem to make the structural parts connected by the connection device rotate asynchronously.

SUMMARY

According to one aspect of the present disclosure, a connection device is provided. The connection device includes a first rotation shaft, a second rotation shaft, a fixed member, a movable member, an elastic part, and a movable member. The first rotation shaft has a first operation part, and the first operation part includes a first protrusion part and a first snap-fit slot adjacently arranged along a circumferential direction of the first rotation shaft. The second rotation shaft has a second operation part, and the second operation part includes a second protrusion part and a second snap-fit slot adjacently arranged along a circumferential direction of the second rotation shaft. The fixed member is configured to keep a distance between the first rotation shaft and the second rotation shaft. The movable member is arranged between the first operation part and the second operation part. The elastic part configured to provide the movable member with a deformation force for moving toward the second operation part. The movable member partially snap-fits in the first snap-fit slot, such that the first rotation shaft is fixed in a rotation direction with respect to the fixed member, and the second rotation shaft is rotatable with respect to the fixed member. The movable member also partially snap-fits in the snap-fit slot such that the second rotation shaft is fixed with in a rotation direction respect to the fixed member, and the first shaft is rotatable with respect to the fixed member.

According to another aspect of the present disclosure, an electronic device is provided. The electronic device includes a first body, a second body, and a connection device. The connection device includes a first rotation shaft, a second rotation shaft, a fixed member, a movable member, an elastic part, and a movable member. The first rotation shaft has a first operation part, and the first operation part includes a first protrusion part and a first snap-fit slot adjacently arranged along a circumferential direction of the first rotation shaft. The second rotation shaft has a second operation part, and the second operation part includes a second protrusion part and a second snap-fit slot adjacently arranged along a circumferential direction of the second rotation shaft. The fixed member is configured to keep a distance between the first rotation shaft and the second rotation shaft. The movable member is arranged between the first operation part and the second operation part. The elastic part configured to provide the movable member with a deformation force for moving toward the second operation part. The movable member partially snap-fits in the first snap-fit slot, such that the first rotation shaft is fixed in a rotation direction with respect to the fixed member, and the second rotation shaft is rotatable with respect to the fixed member. The movable member also partially snap-fits in the snap-fit slot such that the second rotation shaft is fixed with in a rotation direction respect to the fixed member, and the first shaft is rotatable with respect to the fixed member. The first body is fixed to the first rotation shaft, and the second body is fixed to the second rotation shaft.

Reference numerals: 100, first rotation shaft; 110, first operation part; 111, first protrusion part; 112, first snap-fit slot; 113, third snap-fit slot; 120, stopper wheel; 121, first boss; 200, second rotation shaft; 210, second operation part; 211, second protrusion part; 212, the second snap-fit slot; 213, third protrusion part; 300, fixed member; 310, first accommodating slot; 320, second accommodating slot; 330, second boss; 340, first support part; 350, second support part; 400, movable member; 410, first movable member; 420, second movable member; 430, third movable member; 500, elastic member; 510, first elastic member; 520, second elastic member; 610, first connection member; 620, second connection member.

DETAILED DESCRIPTION

The technical solutions of the present disclosure will be further elaborated below with reference to the accompanying drawings and specific embodiments of the description.

In the description of the embodiments of the present disclosure, it should be noted that, unless otherwise stated and limited, the term "connection" should be understood in a broad sense, for example, it may be an electrical connection, or the internal communication between two components, or a direct connection, and may also be indirectly connected through an intermediate medium, and those of ordinary skill in the art can understand the specific meanings of the above terms according to specific situations.

It should be noted that the term "first\second\third" involved in the embodiments of the present disclosure is only to distinguish similar objects, and does not represent a specific ordering of objects. It is understandable that "first\second\third" may interchange a specific order or sequence where permitted. It should be understood that the "first\second\third" distinctions may be interchanged under appropriate circumstances so that the embodiments of the present disclosure described herein may be practiced in sequences other than those illustrated or described herein.

The connection device described in the embodiment of the present disclosure will be described in detail below with reference to FIGS. 1 to 18.

The connection device may include a first rotation shaft 100, a second rotation shaft 200, a fixed member 300, a movable member 400, and an elastic member 500. The first rotation shaft 100 may have a first operation part 110. The first operation part 110 may include a first protrusion part 111 and a first snap-fit slot 112 adjacently arranged in a circumferential direction. The second rotation shaft 200 may have a second operation part 210. The second operation part 210 may include a second protrusion part 211 and a second snap-fit slot 212 adjacently arranged along a circumferential direction. The fixed member 300 is configured to keep a distance between the first rotation shaft 100 and the second rotation shaft 200. The movable member 400 is arranged between the first operation part 110 and the second operation part 210. The elastic member 500 may provide the movable member 400 with a deformation force for moving toward the second operation part 210. The movable member 400 partially snap-fits in the first snap-fit slot 112 such that the first rotation shaft 100 is fixed in a rotation direction with respect to the fixed member 300, and the second rotation shaft 200 can rotate with respect to the fixed member 300. The movable member 400 partially snap-fits in the second snap-fit slot 212 such that the second rotation shaft 200 is fixed in a rotation direction with respect to the fixed member 300, and the first rotation shaft 100 can rotate with respect to the fixed member 300. Accordingly, the first rotation shaft 100 and the second rotation shaft 200 may rotate asynchronously, which greatly improves the adaptability of the connection device.

Figure 1:
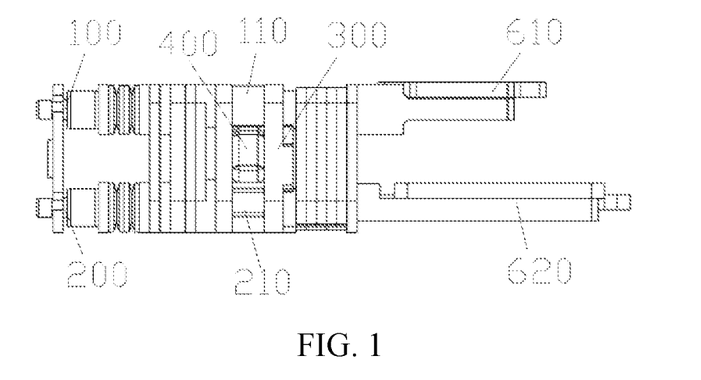
FIG. 1 is a structural schematic diagram of a connection device according to some embodiments of the present disclosure.

In some embodiments of the present disclosure, the first rotation shaft 100 may be configured to connect with other structural members. The first rotation shaft 100 may be directly connected with other structural components. Of course, as shown in FIG. 1, the first connection member 610 may also be fixed on the first rotation shaft 100, and the first rotation shaft 100 may be connected with other structural members through the first connection member 610.

In some embodiments of the present disclosure, the structure of the first operation part 110 is not limited. For example, the first operation part 110 may be a cylindrical structure.

Figure 2:
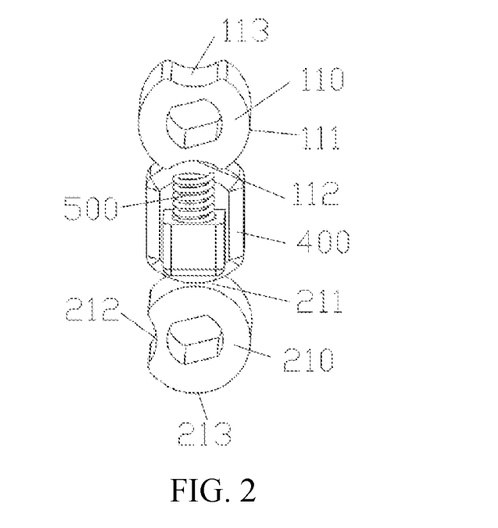
FIG. 2 is a partial structural schematic diagram of the connection device according to some embodiments of the present disclosure.

The first operation part 110 and the first rotation shaft 100 may be an integral structure. Of course, as shown in FIG. 1 and FIG. 2, the first operation part 110 and the first rotation shaft 100 may also be separate structures, and the first operation part 110 may be fixed to an outside of the first rotation shaft 100.

Here, the structures of the first protrusion part 111 and the first snap-fit slot 112 are not limited. For example, as shown in FIG. 2, the first protrusion part 111 may be a cylindrical surface of the first operation part 110, and the first snap-fit slot 112 may be a slot disposed on the cylindrical surface of the first operation part 110.

In some embodiments of the present disclosure, the second rotation shaft 200 may be configured to connect with other structural members. The second rotation shaft 200 may be directly connected with other structural components. Of course, as shown in FIG. 1, a second connection member 620 may also be fixed on the second rotation shaft 200, and the second rotation shaft 200 may be connected with other structural members through the second connection member 620.

In some embodiments of the present disclosure, the structure of the second operation part 210 is not limited. For example, the second operation part 210 may be a cylindrical structure.

The second operation part 210 and the second rotation shaft 200 may have an integrated structure. Of course, as shown in FIG. 1 and FIG. 2, the second operation part 210 and the second rotation shaft 200 may also be separate structures, and the second operation part 210 may be fixed to the outside of the second rotation shaft 200.

Here, the structures of the second protrusion part 211 and the second snap-fit slot 212 are not limited. For example, as shown in FIG. 2, the second protrusion part 211 may be a cylindrical surface of the second operation part 210, and the second snap-fit slot 212 may be a slot disposed on the cylindrical surface of the second operation part 210.

In some embodiments of the present disclosure, the fixed member 300 may be configured to keep the distance between the first rotation shaft 100 and the second rotation shaft 200. The structure of the fixed member 300 is not limited. For example, the fixed member 300 may be a plate-like structure.

Here, a first end of the fixed member 300 can be sleeved outside the first rotation shaft 100, and a second end of the fixed member 300 can be sleeved outside the second rotation shaft 200, such that both the first rotation shaft 100 and the second rotation shaft 200 can rotate with respect to the fixed member 300.

In some embodiments of the present disclosure, the structure of the movable member 400 is not limited. For example, the movable member 400 may be a strip-like structure. For another example, the movable member 400 may be a block-like structure.

Here, the manner in which the movable member 400 is disposed between the first operation part 110 and the second operation part 210 is not limited. For example, the connection device may include a support frame disposed between the first operation part 110 and the second operation part 210, and the movable member 400 may be disposed in a cavity of the support frame.

Figure 15:
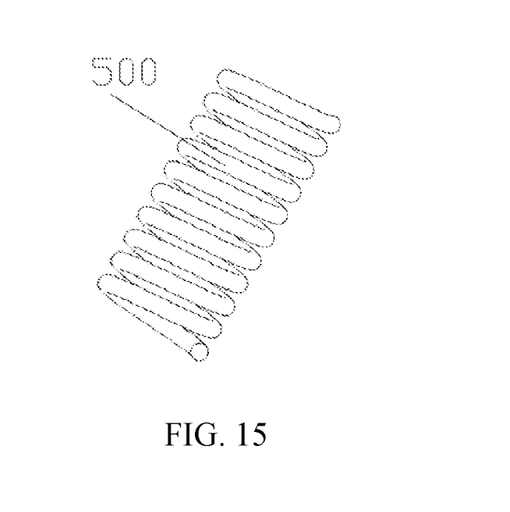
FIG. 15 is a partial structural schematic diagram of an elastic member of the connection device according to some embodiments of the present disclosure.

In some embodiments of the present disclosure, the structure of the elastic member 500 is not limited. For example, as shown in FIG. 15, the elastic member 500 may be a spring. In another example, the elastic member 500 may be a rubber member.

Here, the manner in which the elastic member 500 provides the movable member 400 with the deformation force for moving toward the second operation part 210 is not limited. For example, the elastic member 500 may be in a compressed state, and the elastic member 500 in the compressed state can provide the movable member 400 with a pushing force for moving toward the second operation part 210. In another example, the elastic member 500 may be in a tension state, and the elastic member 500 in the tension state can provide the movable member 400 with a pulling force for moving toward the second operation part 210.

Here, the installation position of the elastic member 500 is not limited. For example, the first end of the elastic member 500 may be connected with the fixed member 300, and the second end of the elastic member 500 may be connected with the movable member 400.

In some embodiments of the present disclosure, since the first protrusion part 111 and the first snap-fit slot 112 are disposed along the circumferential direction of the first rotation shaft 100, the second protrusion part 211 and the second snap-fit slot 212 are disposed along the circumferential direction of the second rotation shaft 200. During the rotation of the first rotation shaft 100 with respect to the second rotation shaft 200, the first end of the movable member 400 can be located in the first snap-fit 112, and the first end of the movable member 400 can also be in contact with the first protrusion part 111. The second end of the movable member 400 can be located in the second snap-fit slot 212, and the second end of the movable member 400 can also be in contact with the second protrusion portion 211.

The shapes of the first end of the movable member 400 and the second end of the movable member 400 are not limited. For example, the first end of the movable member 400 and the second end of the movable member 400 may both be convex arc surfaces.

In one example, as shown in FIG. 2, the first end of the movable member 400 may snap-fit in the first snap-fit slot 112, and the second end of the movable member 400 is in contact with the second protrusion part 211. In this case, the first rotation shaft 100 can be fixed in the rotation direction with respect to the fixed member 300, and the second rotation shaft 200 can rotate with respect to the fixed member 300, such that the first rotation shaft 100 can rotate with respect to the second rotation shaft 200. During the process, the first rotation shaft 100 does not rotate, and the second rotation shaft 200 rotates.

In another example, when the first end of the movable member 400 is in contact with the first protrusion part 111 and the second end of the movable member 400 snap-fits in the second snap-fit slot 212, the first rotation shaft 100 can rotate with respect to the fixed member 300, and the second rotation shaft 200 is fixed in the rotation direction with respect to the fixed member 300, so that during the rotation of the first rotation shaft 100 with respect to the second rotation shaft 200, the first rotation shaft 100 rotates and the second shaft 200 does not rotate.

Figure 3:
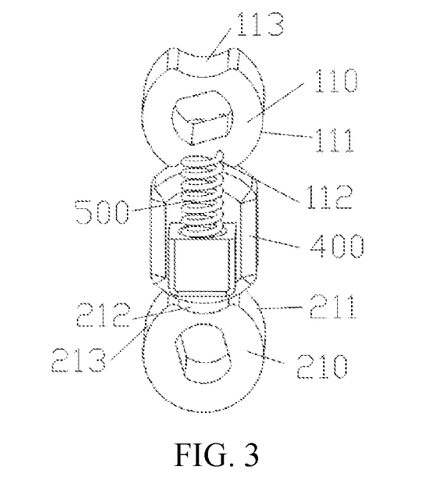
FIG. 3 is a partial structural schematic diagram of the connection device according to some embodiments of the present disclosure.

In another example, as shown in FIG. 3, when the movable member 400 is located between the first snap-fit slot 112 and the second snap-fit slot 212, the second end of the movable member 400 snap-fits in the second snap-fit slot 212 under a deformation force of the elastic member 500, a gap is formed between the first end of the movable member 400 and the first snap-fit slot 112, the first rotation shaft 100 can rotate with respect to the fixed member 300, the second rotation shaft 200 is fixed in the rotation direction with respect to the fixed member 300, such that during the rotation of the first rotation shaft 100 with respect to the second rotation shaft 200, the first rotation shaft 100 rotates and the second rotation shaft 200 does not rotate.

Figure 6:
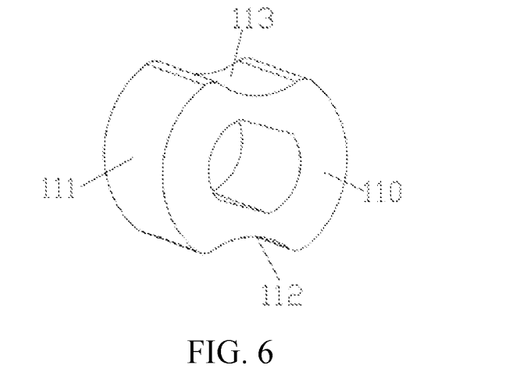
FIG. 6 is a partial structural schematic diagram of a first operation part of the connection device according to some embodiments of the present disclosure.
Figure 7:
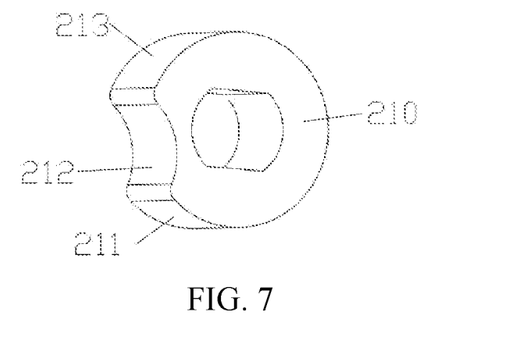
FIG. 7 is a partial structural schematic diagram of a second operation part of the connection device according to some embodiments of the present disclosure.

In some implementations of the embodiments of the present disclosure, the first operation part 110 may further include a third snap-fit slot 113. As shown in FIG. 6, the third snap-fit slot 113 and the first snap-fit slot 112 are located at the opposite side of the first protrusion part 111 in the circumferential direction. The second operation part 210 may further include a third protrusion part 213. As shown in FIG. 7, the third protrusion part 213 and the second protrusion part 211 are located on the opposite side of the second snap-fit slot 212 along the circumferential direction. Accordingly, during the process when the first rotation shaft 100 rotates with respect to the second rotation shaft 200, the first end of the movable member 400 can snap-fit in the three snap-fit slot 113, and the second end of the movable member 400 may also be in contact with the third protrusion part 213.

In this implementation manner, the third snap-fit slot 113 may be a slot provided on the cylindrical surface of the first operation part 110.

The relative positional relationship between the third snap-fit slot 113 and the first snap-fit slot 112 is not limited. For example, as shown in FIG. 2 and FIG. 6, the third snap-fit slot 113 and the first snap-fit slot 112 may be located on opposite sides of the first operation part 110, and the third snap-fit slot 113 and the first slot 112 are located on the first rotation shaft. The circumferential direction of 100 may form an angle of 180 degrees. Of course, an angle of 90 degrees may also be formed between the third snap-fit slot 113 and the first snap-fit slot 112 in the circumferential direction of the first rotation shaft 100.

In this implementation manner, the third protrusion part 213 may be the cylindrical surface of the second operation part 210.

In this implementation manner, the connection device may further include a limit assembly. The limit assembly may be disposed between the first rotation shaft 100 and the fixed member 300, and the limit assembly may be configured to limit the rotation angle of the first rotation shaft 100 with respect to the fixed member 300, such that the first rotation shaft 100 can rotate with respect to the fixed member 300 within a set range through the limit assembly.

The first rotation shaft 100 can rotate with respect to the fixed member 300 between a first limit position and a second limit position based on the limit assembly.

The structure of the limit assembly is not limited. For example, the limit assembly may include a first boss 121 and a second boss 330. The first boss 121 may be disposed on the first rotation shaft 100, the second boss 330 may be disposed on the fixed member 300, and the second boss 330 may be located on the first boss 121 in the circumferential direction of the first rotation shaft 100 within a rotation path. In the situation that the first rotation shaft 100 causes the rotation of the first boss 121 to abut to the second boss 330, the first rotation shaft 100 rotates to the first limit position or the second limit position with respect to the fixed member 300.

The first boss 121 may be directly fixed to the first rotation shaft 100, or may be disposed on other fixed structures of the first rotation shaft 100. For example, as shown in FIGS. 16 and 17, the first boss 121 may be disposed on a stopper wheel 120, and the stopper wheel 120 may be fixed to the first rotation shaft 100.

The first boss 121 may be a bar-shaped structure. Of course, as shown in FIG. 16 and FIG. 17, the first boss 121 may have a fan-shaped structure.

Figure 16:
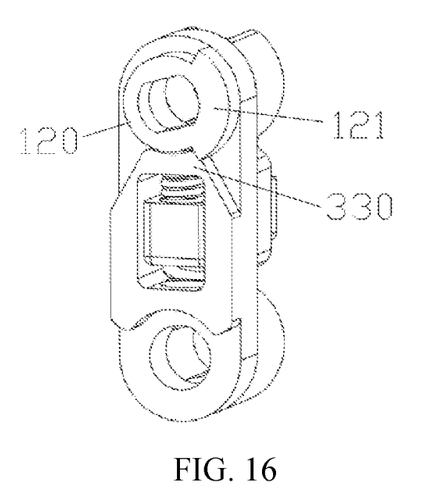
FIG. 16 is a partial structural schematic diagram of the connection device according to some embodiments of the present disclosure.
Figure 17:
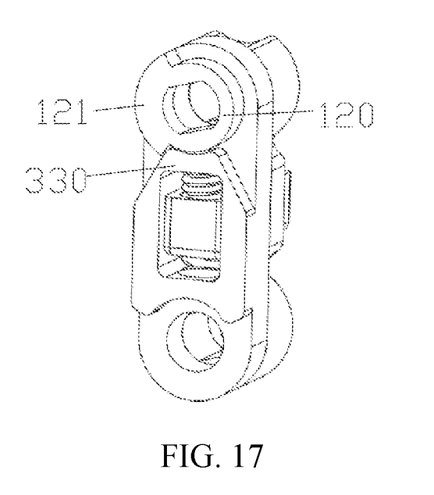
FIG. 17 is a partial structural schematic diagram of the connection device according to some embodiments of the present disclosure.

As shown in FIG. 16 and FIG. 17, the second boss 330 may be disposed on one side of the fixed member 300. The second boss 330 may be a bar-shaped structure. Of course, as shown in FIG. 16 and FIG. 17, the second boss 330 may also have a trapezoidal structure.

Here, the first boss 121 can cause the first rotation shaft 100 to be located at the first limit position or a second limit position with respect to the fixed member 300 by abutting two opposite first surfaces of the first boss 121 in the circumferential direction to two opposite second surfaces of the second boss 330 respectively.

During the rotation of the first rotation shaft 100 with respect to the second rotation shaft 200, the function of the limit assembly is not limited.

Figure 4:
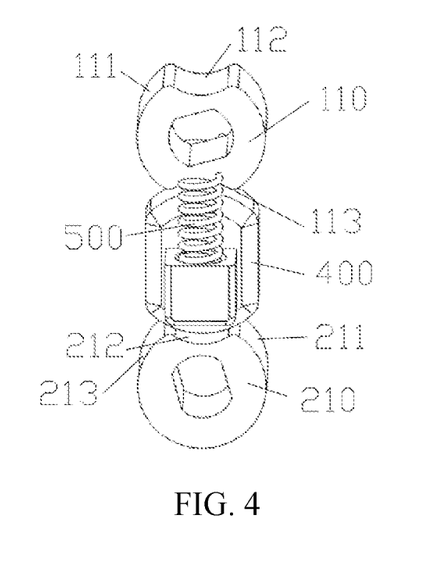
FIG. 4 is a partial structural schematic diagram of the connection device according to some embodiments of the present disclosure.

For example, when the first rotation shaft 100 rotates to a first limit position with respect to the fixed member 300 based on the limit assembly, as shown in FIG. 4, the movable member 400 may be located between the third snap-fit slot 113 and the second snap-fit slot 212, the first rotation shaft 100 is fixed in the first rotation direction with respect to the fixed member 300, the second end of the movable member 400 snap-fits in the second snap-fit slot 212 under the deformation force of the elastic member 500, and a gap may be formed between the first end of the movable member 400 and the third snap-fit slot 113. Under the action of an external force, the second end of the movable member 400 can disengage from the second snap-fit slot 212 to contact the third protrusion part 213 of the second operation part 210, and the second ration shaft 200 can rotate with respect to the fixed member 300. The first rotation shaft 100 is fixed in the first rotation direction with respect to the fixed member 300 due to the limit assembly, and the external force overcomes the deformation force of the elastic member 500 such that the movable member 400 can move toward a side closer to third snap-fit slot 113, thereby causing the second end of the movable member 400 to disengage with the second snap-fit slot 212 to contact with the third protrusion part 213.

In another example, when the first rotation shaft 100 rotates to the second limit position with respect to the fixed member 300 due to the limit assembly, as shown in FIG. 3, the movable member 400 may be located between the first snap-fit slot 112 and the second snap-fit slot 212, the first rotation shaft 100 may be fixed in the second rotation direction with respect to the fixed member 300, the second end of the movable member 400 snap-fits in the second snap-fit slot 112 under the deformation force of the elastic member 500, a gap may be formed between the first end of the movable member 400 and the first snap-fit slot 112. Under the action of the external force, the second end of the movable member 400 may disengage with the second snap-fit 212 to contact with the second protrusion part 211 of the second operation part 210, and the second rotation shaft 200 can rotate with respect to the fixed member 300. The first rotation shaft 100 can be fixed in the second rotation direction with respect to the fixed member 300 due to the limit assembly. The external force overcomes the deformation force of the elastic member 500 such that the movable member 400 can move toward the side closer to the first snap-fit slot 112, thereby causing the second end of the movable member 400 to disengage with the second snap-fit to contact with the second protrusion part 211.

The second rotation direction may be opposite to the first rotation direction. The first rotation shaft 100 can rotate within the range defined by the first snap-fit slot 112 and the third snap-fit slot 113 through the action of the limit assembly.

In this implementation manner, based on the first protrusion part 111, the first snap-fit slot 112, and the third snap-fit slot 113 of the first operation part 110, and based on the second protrusion part 211, the second snap-fit slot 212 and the third protrusion part 213 can cause one of the first rotation shaft 100 and the second rotation shaft 200 to rotate, which greatly improves the adaptability of the connection device.

In one example, as shown in FIG. 2, when the first end of the movable member 400 snap-fits in the first snap-fit slot 112, and the second end of the movable member 400 is in contact with the second protrusion part 211, the first rotation shaft 100 is fixed in the first rotation direction with respect to the fixed member 300, and the second rotation shaft 200 rotates with respect to the fixed member 300 under the action of an external force. As shown in FIG. 3, when the second rotation shaft 200 rotates until the first snap-fit slot 112 is opposite the second snap-fit slot 212, the second end of the movable member 400 snap-fits to the second snap-fit slot 212 under the deformation force of the elastic member 500, the second rotation shaft 200 is fixed in the rotation direction with respect to the fixed member 300, a gap may be formed between the first end of the movable member 400 and the first snap-fit slot 112, the rotation shaft 100 can rotate with respect to the fixed member 300, the first protrusion part 111 is in contact with the first end of the movable member 400. As shown in FIG. 4, under the action of the external force, when the first rotation shaft 100 rotates until the third snap-fit slot 113 is opposite the second snap-fit slot 212, the first rotation shaft 100 can rotate to a first limit position with respect to the fixed member 300 due to the limit assembly, the first rotation shaft 100 can be fixed in the first rotation direction with respect to the fixed member 300, the second end of the movable member 400 snap-fits to the second snap-fit slot 212 under the deformation force of the elastic member 500, and a gap may be formed between the first end of the movable member 400 and the third snap-fit slot 113. Under the action of the external force, the second end of the movable member 400 may disengage with the second snap-fit slot 212 to contact the third protrusion part 213, and the second rotation shaft 200 can rotate with respect to the fixed member 300, as shown in FIG. 5.

Figure 5:
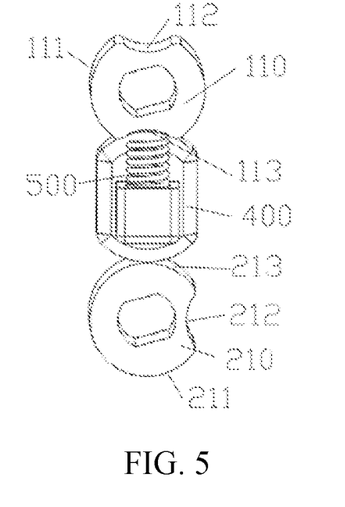
FIG. 5 is a partial structural schematic diagram of the connection device according to some embodiments of the present disclosure.

It should be noted that the connection device can also rotate in the opposite direction from the position shown in FIG. 5 through the position shown in FIG. 4 and the position shown in FIG. 3 to the position shown in FIG. 2.

In another example, as shown in FIG. 5, in the situation when the first end of the movable member 400 snap-fits in the third snap-fit slot 113, and the second end of the movable member 400 is in contact with the third protrusion part 213, the first rotation shaft 100 may be fixed in the second rotation direction with respect to the fixed member 300, and the second rotation shaft 200 rotates with respect to the fixed member 300 under the action of an external force. As shown in FIG. 4, when the second rotation shaft 200 rotates until the third snap-fit slot 113 is opposite the second snap-fit slot 212, the second end of the movable member 400 snap-fits in the second snap-fit slot 212 under the deformation force of the elastic member 500, the second rotation shaft 200 is fixed in the rotation direction with respect to the fixed member 300, a gap may be formed between the first end of the movable member 400 and the third snap-fit slot 113, and the first rotation shaft 100 can rotate with respect to the fixed member 300. The first protrusion part 111 is in contact with the first end of the movable member 400. As shown in FIG. 3, the first rotation shaft 100 rotates until the first snap-fit slot 112 is opposite the second snap-fit slot 212, the first rotation shaft 100 can rotate to the second limit position with respect to the fixed member 300 based on the limit assembly, and the first rotation shaft 100 can rotate in the second rotation direction with respect to the fixed member 300, the second end of the movable member 400 snap-fits in the second snap-fit slot 212 under the deformation force of the elastic member 500, and a gap may be formed between the first end of the movable member 400 and the first snap-fit slot 112, the second end of the movable member 400 may engage from the second snap-fit slot 212 under the action of the external force to contact with the third protrusion part 213, and the second shaft 200 can rotate with respect to the fixed member 300, as shown in FIG. 2.

Figure 8:
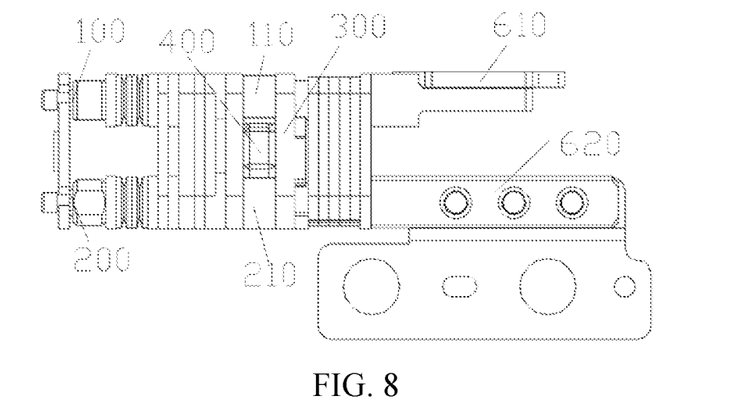
FIG. 8 is a partial structural schematic diagram of the connection device according to some embodiments of the present disclosure.
Figure 9:
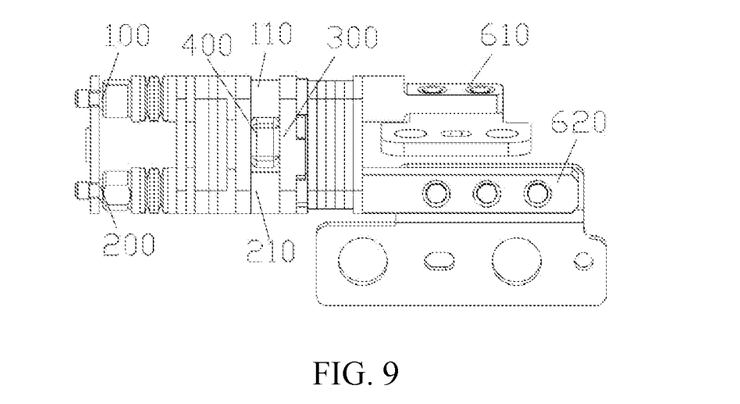
FIG. 9 is a partial structural schematic diagram of the connection device according to some embodiments of the present disclosure.
Figure 10:
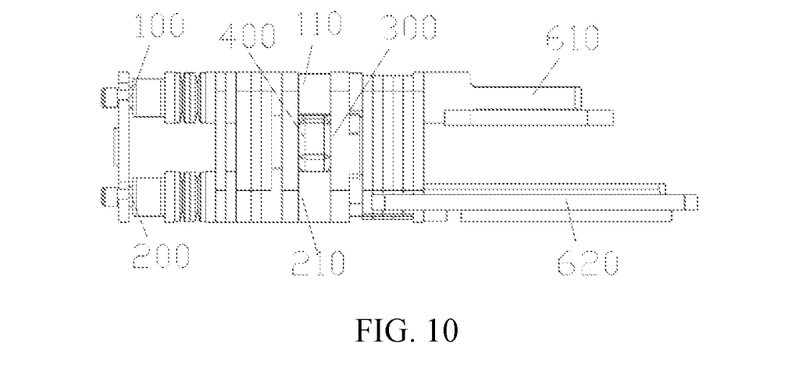
FIG. 10 is a partial structural schematic diagram of the connection device according to some embodiments of the present disclosure.

In an application scenario, the second protrusion part 211 and the second snap-fit slot 212 form an angle of 90 degrees in the circumferential direction of the second rotation shaft 200, and the second protrusion part 211 and the third protrusion part 213 form an angle of 180 degrees in the circumferential direction. The first snap-fit slot 112 and the third snap-fit slot 113 form an angle of 180 degrees in the circumferential direction of the first rotation shaft 100. An initial state of the connection device may be shown in FIG. 1 and FIG. 2. At this time, an angle of 0 degree may be formed between the first connection member 610 and the second connection member 620. Under the action of the external force, the second connection member 620 rotates 90 degrees with the second rotation shaft 200 to the state as shown in FIG. 3 and FIG. 8, then the first connection member 610 rotates 180 degrees with the first rotation shaft 100 to the state as shown in FIG. 4 and FIG. 9, and finally the second connection member 620 rotates 90 degrees with the second connection shaft to the state as shown in FIG. 5 and FIG. 10. At this time, an angle of 360 degrees may be formed between the first connection member 610 and the second connection member 620, the first connection member 610 rotates 180 degrees with the first rotation shaft 100, and the second connection member 620 rotates 180 degrees with the second rotation shaft 200. Accordingly, the first connection member 610 and the second connection member 620 can implement the switching from 0 degree angle to 180 degree angle respectively through asynchronous rotation, which greatly improves the adaptability of the connection device. Of course, the first connection member 610 and the second connection member 620 can also implement the switching from the angle of 180 degrees to the angle of 0 degree respectively through asynchronous rotation.

Of course, those skilled in the art can set the angles formed by the first protrusion part 111, the first snap-fit slot 112, and the third snap-fit slot 113 in the circumferential direction of the first rotation shaft 100, and the angles formed by the second protrusion part 211, the second snap-fit slot 212, and the third protrusion part 213 in the circumferential direction of the second rotation shaft 200 according to actual needs, such that the first connection member 610 and the second connection member can rotate independently within different angle ranges.

Figure 11:
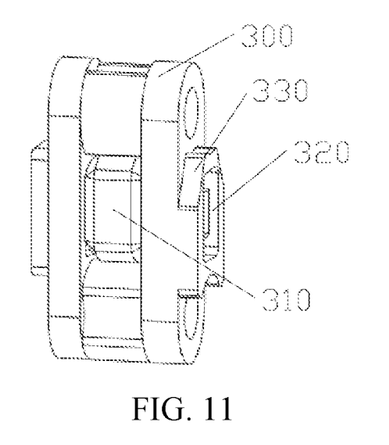
FIG. 11 is a partial structural schematic diagram of the connection device according to some embodiments of the present disclosure.
Figure 12:
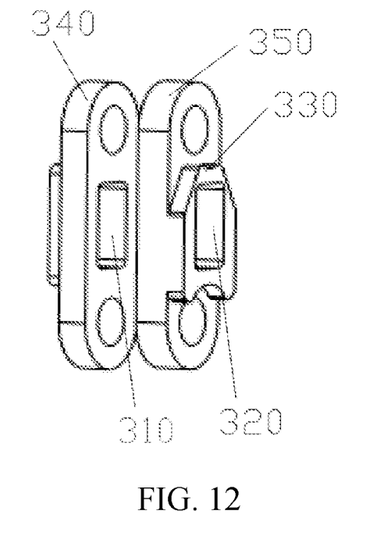
FIG. 12 is a partial structural schematic diagram of a fixed member of the connection device according to some embodiments of the present disclosure.
Figure 13:
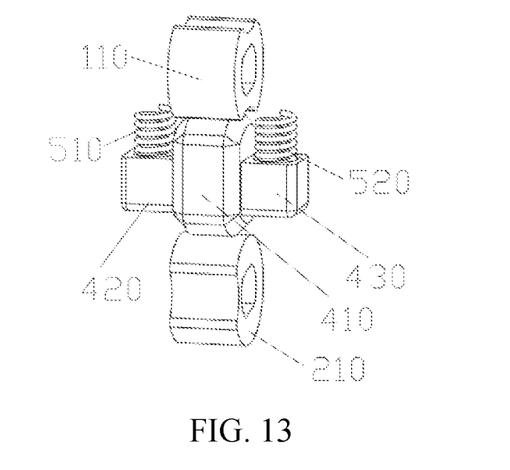
FIG. 13 is a partial structural schematic diagram of the connection device according to some embodiments of the present disclosure.
Figure 14:
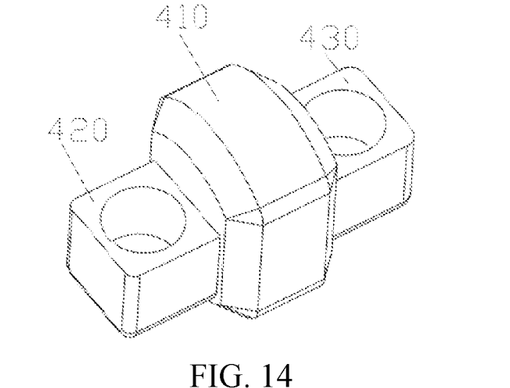
FIG. 14 is a partial structural schematic diagram of a movable member of the connection device according to some embodiments of the present disclosure.
Figure 18:
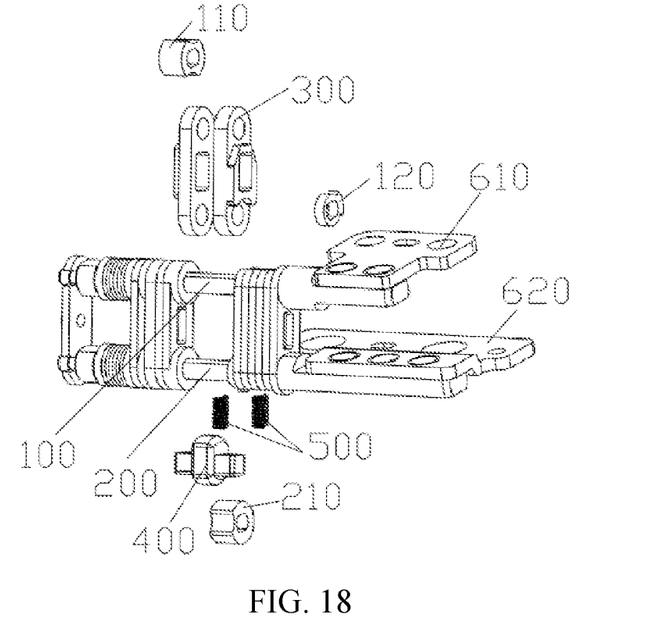
FIG. 18 is a structural exploded view of the connection device according to some embodiments of the present disclosure.

In some implementations of the embodiments of the present disclosure, as shown in FIGS. 11 and 12, the fixed member 300 has a first accommodating slot 310 and a second accommodating slot 320 arranged at intervals. As shown in FIGS. 13 and 14, the movable member 400 may include a first movable member 410, a second movable member 420, and a third movable member 430. The first movable member 410 is located between the first operation part 110 and the second operation part 210 in a first direction, and the first movable member 410 is located between the first accommodating slot 310 and the second accommodating slot 320 in a second direction. The second movable member 420 may be inserted into the first accommodating slot 310, and the second movable member 420 may be connected with the first movable member 410. The third movable member 430 may be inserted into the second accommodating slot 320, and the third movable member 430 may be connected with the first movable member 410. As shown in FIG. 13 and FIG. 18, the elastic member 500 may include a first elastic member 510 and a second elastic member 520. The first elastic member 510 may be located in the first accommodating slot 310, and the first elastic member 510 can provide the second movable portion 420 with a pushing force for moving toward the second operation part 210. The second elastic member 520 is located in the second accommodating slot 320, and the second elastic member 520 can provide the third movable member 430 with a pushing force for moving toward the second operation part 210.

In this implementation manner, the first direction and the second direction are not limited. For example, the first direction and the second direction may satisfy a vertical condition, and the vertical condition may be vertical or substantially vertical.

In this implementation manner, the structure of the fixed member 300 is not limited. For example, the fixed member 300 may include a first support part 340 and a second support part 350. The first support part 340 is rotatably connected to the first rotation shaft 100 and the second rotation shaft 200 respectively, and a middle part of the first support part 340 may be provided with the first accommodating slot 310. The second support part 350 may be rotatably connected with the first rotation shaft 100 and the second rotation shaft 200 respectively, the second support part 350 may be connected with the first support, and a middle part of the second support part 350 may be provided with the second accommodating slot 320. The first movable member 410 is located between the first support part 340 and the second support part 350. The first operation part 110 is located between the first support part 340 and the second support part 350, and the second operation part 210 is located between the first support part 340 and the second supporting part 350.

In some embodiments, the first boss 121 may be disposed on a side of the second support part 350 away from the first support part 340, and correspondingly, the second boss 330 may be disposed on the side of the second support part 350 away from the first support part 340. Of course, the first boss 121 can also be disposed on a side of the first support part 340 away from the second support part 350, and correspondingly, the second boss 330 can also be disposed on the side of the first support part 340 away from the second support part 350.

In this implementation manner, the first accommodating slot 310 may be configured to accommodate the second movable member 420 and the first elastic member 510. A wall having the first accommodating slot 310 can also prevent the first movable portion 410 from moving toward the first accommodating slot 310. The second accommodating slot 320 may be configured to accommodate the third movable member 430 and the third elastic member 500. A wall having the second accommodating slot 320 can also prevent the first movable portion 410 from moving toward the second accommodating slot 320.

In this implementation manner, both the first elastic member 510 and the second elastic member 520 are in a compressed state, the first end of the first elastic member 510 abuts with a first wall of the first accommodating slot 310, and the first wall is located on the side of the first rotation shaft 100. The second end of the first elastic member 510 abuts with the second movable member 420, such that the first elastic member 510 can provide the second movable member 420 with a pushing force for moving toward the second operation part 210. The first end of the second elastic member 520 abuts with the second wall of the second accommodating slot 320, and the second wall is located on the side of the first rotation shaft 100. The second end of the second elastic member 520 abuts with the third movable member 430, so that the second elastic member 520 can provide the second movable member with a pushing force for moving toward the second operation part 210. The second movable member 420 and the third movable member 430 that are opposite the first movable member 410 may be pushed by the first elastic member 510 and the second elastic member 520, such that the first movable member 410 can move smoothly between the first operation part 110 and the second operation part 210, to prevent both sides of the first movable portion 410 from unevenness that can cause a stop.

The first elastic member 510 and the second elastic member 520 are similar to the above-mentioned elastic member 500, and will not be described herein again.

The connection device of the embodiment of the present disclosure may include a first rotation shaft 100 having a first operation part 110. The first operation part 110 may include a first protrusion part 111 and a first snap-fit slot 112 adjacently arranged in the circumferential direction. The connection device may further include a second rotation shaft 200 having a second operation part 210. The second operation part 210 may include a second protrusion part 211 and a second snap-fit slot 212 adjacently arranged in the circumferential direction. The connection device may further include a fixed member 300 configured to keep a distance between the rotation shaft 100 and the second rotation shaft 200, a movable member 400 arranged between the first operation part 110 and the second operation part 210, an elastic member 500 configured to provide with the movable member 400 with a pushing force for moving toward the second operation part 210. The movable member 400 partially snap-fits in the first snap-fit slot 112 to fix the first rotation shaft 100 in the rotation direction with respect the fixed member 300, such that the second shaft 200 can rotate with respect to the fixed member 300. The movable member 400 partially snap-fits in the second snap-fit slot 212 so that the second rotation shaft 200 can rotate with respect to the fixed member 300. The first rotation shaft 100 can rotate with respect to the fixed member 300, such that the first rotation shaft 100 and the second rotation shaft 200 can rotate asynchronously, which greatly improves the adaptability of the connection device.

The embodiments of the present disclosure further provides an electronic device. The electronic device may include a first body, a second body, and the connection device according to the embodiments of the present disclosure. The first body is fixed to the first rotation shaft 100 connection, and the second body is fixed to the second rotation shaft 200, such that the first body and the second body can rotate asynchronously, which improves the adaptability of the electronic device.

In the embodiments of the present disclosure, the structure of the electronic device is not limited. For example, the electronic device may be a gaming machine. In another example, the electronic device may be a laptop computer.

In the embodiments of the present disclosure, the structure of the first body is not limited. For example, the first body may have a first display device. In another example, the first body may be a body where the display of the laptop computer is located.

The first display device may include a first display.

The first body can be fixed to the first rotation shaft 100 directly, or may be fixed to the first rotation shaft 100 through the first connection member 610.

In the embodiments of the present disclosure, the structure of the second body is not limited. For example, the second body may be provided with an input device. In another example, the second body may have a second display device. In another example, the second body may have the second display device and the input device.

According to the embodiments of the present disclosure, the second display device may include a second display. The input device may include a keyboard or a touchpad.

As an example, the second body may be a body where the keyboard of the laptop computer is located.

According to the embodiments of the present disclosure, the second body can be fixed to the first rotation shaft 100 directly, or can be fixed to the second rotation shaft 200 through the second connection member 620.

The above are only specific implementations of the disclosure, but the protection scope of the disclosure is not limited to this. Accordingly, changes or substitutions within the technical scope disclosed in the present disclosure that any person skilled in the art can easily think of should be covered by the protection scope of the disclosure. Therefore, the protection scope of the disclosure shall be subject to the protection scope of the accompanying claims.

What is claimed is:

1. A connection device, comprising:
   a first rotation shaft having a first operation part, the first operation part including a first protrusion part and a first snap-fit slot adjacently arranged along a circumferential direction of the first rotation shaft;
   a second rotation shaft having a second operation part, the second operation part including a second protrusion part and a second snap-fit slot adjacently arranged along a circumferential direction of the second rotation shaft;
   a fixed member configured to keep a distance between the first rotation shaft and the second rotation shaft;
   a movable member arranged between the first operation part and the second operation part; and
   an elastic part configured to provide the movable member with a deformation force for moving toward the second operation part;
   wherein:
   the movable member is configured to be:
   partially snap-fit in the first snap-fit slot, such that the first rotation shaft is fixed in a rotation direction with respect to the fixed member, and the second rotation shaft is rotatable with respect to the fixed member, and
partially snap-fit in the second snap-fit slot,
such that the second rotation shaft is fixed in a rotation direction with respect to the fixed member, and the first shaft is rotatable with respect to the fixed member; and
the first operation part further comprises a third snap-fit slot, the third snap-fit slot and the first snap-fit slot being disposed at opposite sides of the first protrusion part in the circumferential direction of the first rotation shaft.

2. The connection device according to claim 1, wherein:
when a first end of the movable member snap-fits in the first snap-fit slot and a second end of the movable member abuts with a second protrusion part, the first rotation shaft is fixed with respect to the fixed member in the rotation direction and the second rotation shaft is rotatable with respect to the fixed member; and
when the first end of the movable member abuts with the first protrusion part and the second end of the movable member snap-fits in the second snap-fit slot, the first rotation shaft is rotatable with respect to the fixed member and the second rotation shaft is fixed in the rotation direction with respect to the fixed member.

3. The connection device according to claim 1, wherein:
when the movable member is located between the first snap-fit slot and the second snap-fit slot, the second end of the movable member snap-fits in the second snap-fit slot under a deformation force of the elastic member, a gap is formed between the first end of the movable member and the first snap-fit slot, the first shaft is rotatable with respect to the fixed member, and the second rotation shaft is fixed in the rotation direction with respect to the fixed member.

4. The connection device according to claim 1, wherein:
the second operation part further comprises a third protrusion part, the third protrusion part and the second protrusion part being disposed on opposite sides of the second snap-fit slot in the circumferential direction of the second rotation shaft; and
the connection device further comprises:
a limit assembly disposed between the first rotation shaft and the fixed member, the limit assembly being configured to limit a rotation angle of the first rotation shaft with respect to the fixed member,
when the first rotation shaft rotates to a first limit position with respect to the fixed member based on the limit assembly, the movable member is located between the third snap-fit slot and the second snap-fit slot, the first rotation shaft is fixed in the rotation direction with respect to the fixed member, the second end of the movable member snap-fits in the second snap-fit slot under the deformation force of the elastic member, and a gap is formed between the first end of the movable member and the third snap-fit slot, the second end of the movable member disengages from the second snap-fit slot to contact with the third protrusion part under an action of an external force, and the second rotation shaft is rotatable with respect to the fixed member.

5. The connection device according to claim 4, wherein the first rotation shaft is rotatable with respect to the fixed member by an angle of 180 degrees based on a contact between the first protrusion part and the first end of the movable member.

6. The connection device according to claim 4, wherein:
when the first end of the movable member snap-fits in the first snap-fit slot, and the second end of the movable member is in contact with the second protrusion, the first rotation shaft is fixed in the rotation direction with respect to the fixed member, the second rotation shaft rotates with respect to the fixed member under the action of the external force;
when the second rotation shaft rotates until the first snap-fit slot is opposite the second snap-fit slot, the second end of the movable member snap-fits in the second slot under the deformation force of the elastic member, the second rotation shaft is fixed in the rotation direction with respect to the fixed member, a gap is formed between the first end of the movable member and the first snap-fit slot, and the first rotation shaft is rotatable with respect to the fixed member;
under the action of the external force, when the first rotation shaft rotates until the third snap-fit slot is opposite the second snap-fit slot, the first rotation shaft rotates to a first limit position with respect to the fixed member based on the limit assembly, the first rotation shaft is fixed in the rotation direction with respect to the fixed member, the second end of the movable piece snap-fits in the second snap-fit slot under the deformation force of the elastic piece, a gap is formed between the first end of the movable member and the first snap-fit slot, the second end of the movable member disengages from the second snap-fit slot to contact with the third protrusion part under the action of the external force, and the second rotation shaft is rotatable with respect to the fixed member.

7. The connection device according to claim 4, wherein the limit assembly comprises:
a first boss arranged on the first rotation shaft; and
a second boss arranged on the fixed member, the second boss being located in a rotation path of the first boss in the circumferential direction of the first rotation shaft,
wherein when the first rotation shaft drives the first boss to rotate to abut with the second boss, the first rotation shaft rotates to the first limit position or the second limit position with respect to the fixed member.

8. The connection device according to claim 1, wherein:
the fixed member has a first accommodating slot and a second accommodating slot arranged at intervals;
the moving member comprises:
a first movable member located between the first operation part and the second operation part in a first direction and located between the first accommodating slot and the second accommodating slot in a second direction, wherein the first direction is vertical to the second direction;
a second movable member inserted in the first accommodating slot and connected with the first movable member; and
a third movable member inserted in the second accommodating slot and connected with the first movable member; and
the elastic member comprises:
a first elastic member located in the first accommodating slot, the first elastic member being configured to provide the second movable member with a first pushing force for moving toward the second operation part; and
a second elastic member located in the second accommodating slot, the second elastic member being configured to provide the third movable member with a second pushing force for moving toward the second operation part.

9. An electronic device, comprising:
   a first body;
   a second body; and
   a connection device, comprising:
      a first rotation shaft having a first operation part, the first operation part including a first protrusion part and a first snap-fit slot adjacently arranged along a circumferential direction of the first rotation shaft;
      a second rotation shaft having a second operation part, the second operation part including a second protrusion part and a second snap-fit slot adjacently arranged along a circumferential direction of the second rotation shaft;
      a fixed member configured to keep a distance between the first rotation shaft and the second rotation shaft;
      a movable member arranged between the first operation part and the second operation part; and
      an elastic part configured to provide the movable member with a deformation force for moving toward the second operation part;
   wherein:
      the movable member is configured to be:
         partially snap-fit in the first snap-fit slot, such that the first rotation shaft is fixed in a rotation direction with respect to the fixed member, and the second rotation shaft is rotatable with respect to the fixed member, and
         partially snap-fit in the snap-fit slot, such that the second rotation shaft is fixed in a rotation direction with respect to the fixed member, and the first shaft is rotatable with respect to the fixed member;
      the first body is fixed to the first rotation shaft;
      the second body is fixed to the second rotation shaft; and
      the first operation part further comprises a third snap-fit slot, the third snap-fit slot and the first snap-fit slot being disposed at opposite sides of the first protrusion part in the circumferential direction of the first rotation shaft.

10. The electronic device according to claim 9, wherein the first body has a first display device, and the second body has one or more of: an input device and a second display device.

11. The electronic device according to claim 9, wherein:
    when a first end of the movable member snap-fits in the first snap-fit slot and a second end of the movable member abuts with a second protrusion part, the first rotation shaft is fixed with respect to the fixed member in the rotation direction and the second rotation shaft is rotatable with respect to the fixed member; and
    when the first end of the movable member abuts with the first protrusion part and the second end of the movable member snap-fits in the second snap-fit slot, the first rotation shaft is rotatable with respect to the fixed member and the second rotation shaft is fixed in the rotation direction with respect to the fixed member.

12. The electronic device according to claim 9, wherein:
    when the movable member is located between the first snap-fit slot and the second snap-fit slot, the second end of the movable member snap-fits in the second snap-fit slot under a deformation force of the elastic member, a gap is formed between the first end of the movable member and the first snap-fit slot, the first shaft is rotatable with respect to the fixed member, and the second rotation shaft is fixed in the rotation direction with respect to the fixed member.

13. The electronic device according to claim 9, wherein:
    the second operation part further comprises a third protrusion part, the third protrusion part and the second protrusion part being disposed on opposite sides of the second snap-fit slot in the circumferential direction of the second rotation shaft; and
    the connection device further comprises:
       a limit assembly disposed between the first rotation shaft and the fixed member, the limit assembly being configured to limit a rotation angle of the first rotation shaft with respect to the fixed member,
       when the first rotation shaft rotates to a first limit position with respect to the fixed member based on the limit assembly, the movable member is located between the third snap-fit slot and the second snap-fit slot, the first rotation shaft is fixed in the rotation direction with respect to the fixed member, the second end of the movable member snap-fits in the second snap-fit slot under the deformation force of the elastic member, and a gap is formed between the first end of the movable member and the third snap-fit slot, the second end of the movable member disengages from the second snap-fit slot to contact with the third protrusion part under an action of an external force, and the second rotation shaft is rotatable with respect to the fixed member.

14. The connection device according to claim 13, wherein the first rotation shaft is rotatable with respect to the fixed member by an angle of 180 degrees based on a contact between the first protrusion part and the first end of the movable member.

15. The connection device according to claim 13, wherein:
    when the first end of the movable member snap-fits in the first snap-fit slot, and the second end of the movable member is in contact with the second protrusion, the first rotation shaft is fixed in the rotation direction with respect to the fixed member, the second rotation shaft rotates with respect to the fixed member under the action of the external force;
    when the second rotation shaft rotates until the first snap-fit slot is opposite the second snap-fit slot, the second end of the movable member snap-fits in the second slot under the deformation force of the elastic member, the second rotation shaft is fixed in the rotation direction with respect to the fixed member, a gap is formed between the first end of the movable member and the first snap-fit slot, and the first rotation shaft is rotatable with respect to the fixed member;
    under the action of the external force, when the first rotation shaft rotates until the third snap-fit slot is opposite the second snap-fit slot, the first rotation shaft rotates to a first limit position with respect to the fixed member based on the limit assembly, the first rotation shaft is fixed in the rotation direction with respect to the fixed member, the second end of the movable piece snap-fits in the second snap-fit slot under the deformation force of the elastic piece, a gap is formed between the first end of the movable member and the first snap-fit slot, the second end of the movable member disengages from the second snap-fit slot to contact with the third protrusion part under the action of the external force, and the second rotation shaft is rotatable with respect to the fixed member.

16. The connection device according to claim 13, wherein the limit assembly comprises:
- a first boss arranged on the first rotation shaft; and
- a second boss arranged on the fixed member, the second boss being located in a rotation path of the first boss in the circumferential direction of the first rotation shaft,
- wherein when the first rotation shaft drives the first boss to rotate to abut with the second boss, the first rotation shaft rotates to the first limit position or the second limit position with respect to the fixed member.

17. The connection device according to claim 9, wherein:
- the fixed member has a first accommodating slot and a second accommodating slot arranged at intervals;
- the moving member comprises:
  - a first movable member located between the first operation part and the second operation part in a first direction and located between the first accommodating slot and the second accommodating slot in a second direction, wherein the first direction is vertical to the second direction;
  - a second movable member inserted in the first accommodating slot and connected with the first movable member; and
  - a third movable member inserted in the second accommodating slot and connected with the first movable member; and
- the elastic member comprises:
  - a first elastic member located in the first accommodating slot, the first elastic member being configured to provide the second movable member with a first pushing force for moving toward the second operation part; and
  - a second elastic member located in the second accommodating slot, the second elastic member being configured to provide the third movable member with a second pushing force for moving toward the second operation part.

18. A connection device, comprising:
- a first rotation shaft having a first operation part, the first operation part including a first protrusion part and a first snap-fit slot adjacently arranged along a circumferential direction of the first rotation shaft;
- a second rotation shaft having a second operation part, the second operation part including a second protrusion part and a second snap-fit slot adjacently arranged along a circumferential direction of the second rotation shaft;
- a fixed member configured to keep a distance between the first rotation shaft and the second rotation shaft, the fixed member including a first accommodating slot and a second accommodating slot arranged at intervals;
- a movable member arranged between the first operation part and the second operation part, and including:
  - a first movable member located between the first operation part and the second operation part in a first direction and located between the first accommodating slot and the second accommodating slot in a second direction, wherein the first direction is vertical to the second direction;
  - a second movable member inserted in the first accommodating slot and connected with the first movable member; and
  - a third movable member inserted in the second accommodating slot and connected with the first movable member; and
- an elastic part configured to provide the movable member with a deformation force for moving toward the second operation part, and including:
  - a first elastic member located in the first accommodating slot, the first elastic member being configured to provide the second movable member with a first pushing force for moving toward the second operation part; and
  - a second elastic member located in the second accommodating slot, the second elastic member being configured to provide the third movable member with a second pushing force for moving toward the second operation part;
- wherein the movable member is configured to be:
  - partially snap-fit in the first snap-fit slot, such that the first rotation shaft is fixed in a rotation direction with respect to the fixed member, and the second rotation shaft is rotatable with respect to the fixed member, and
  - partially snap-fit in the second snap-fit slot, such that the second rotation shaft is fixed in a rotation direction with respect to the fixed member, and the first shaft is rotatable with respect to the fixed member.

* * * * *